(12) United States Patent
Del Carpio Vega et al.

(10) Patent No.: US 11,349,580 B2
(45) Date of Patent: May 31, 2022

(54) TRANSMISSION COORDINATION FOR INTERFERENCE ASSESSMENT

(71) Applicant: Telefonaktiebolaget LM Ericsson (publ), Stockholm (SE)

(72) Inventors: Luis Felipe Del Carpio Vega, Espoo (FI); Guido Roland Hiertz, Aachen (DE); Anna Larmo, Espoo (FI); Yu Wang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1 day.

(21) Appl. No.: 16/760,036

(22) PCT Filed: Dec. 21, 2017

(86) PCT No.: PCT/EP2017/084142
§ 371 (c)(1),
(2) Date: Apr. 29, 2020

(87) PCT Pub. No.: WO2019/120547
PCT Pub. Date: Jun. 27, 2019

(65) Prior Publication Data
US 2020/0351003 A1    Nov. 5, 2020

(51) Int. Cl.
*H04W 92/18* (2009.01)
*H04B 17/336* (2015.01)
*H04B 17/318* (2015.01)
*H04W 24/08* (2009.01)
*H04W 52/24* (2009.01)
(Continued)

(52) U.S. Cl.
CPC .......... *H04B 17/336* (2015.01); *H04B 17/318* (2015.01); *H04W 24/08* (2013.01); *H04W 52/243* (2013.01); *H04W 72/0473* (2013.01); *H04W 72/082* (2013.01)

(58) Field of Classification Search
CPC ... H04W 72/0446; H04W 72/12; H04W 4/46; H04W 84/005; H04W 84/20; H04W 16/28; H04W 36/20; H04W 92/18; H04B 7/0617
See application file for complete search history.

(56) References Cited

U.S. PATENT DOCUMENTS

2009/0040985 A1 * 2/2009 Barnawi ............. H04W 52/241
370/336
2010/0291945 A1 11/2010 Jang
(Continued)

OTHER PUBLICATIONS

International Search Report and Written Opinion of the International Searching Authority, PCT/EP2017/084142, dated Sep. 20, 2018, 13 Pages.
(Continued)

*Primary Examiner* — Tu X Nguyen
(74) *Attorney, Agent, or Firm* — Christopher & Weisberg, P.A.

(57) ABSTRACT

During transmission of data by radio transmissions from a first radio device to a second radio device, a third radio device is controlled to transmit an interference signal on radio resources used by the radio transmissions from the first radio device to the second radio device. The transmission of the data is coordinated with transmission of the interference signal, and an effect of the interference signal on the radio transmissions is monitored.

24 Claims, 6 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 2011/0268028 A1* | 11/2011 | Stern-Berkowitz | ............................ H04L 5/0048 370/328 |
| 2012/0155403 A1 | 6/2012 | Lee | |
| 2013/0010725 A1 | 1/2013 | Wu et al. | |
| 2013/0121186 A1* | 5/2013 | Vajapeyam | ......... H04W 72/085 370/252 |
| 2017/0214493 A1 | 7/2017 | Hampel et al. | |

OTHER PUBLICATIONS

Huawei et al., "Interference measurement enhancement in LTE Rel-14", 3GPP TSG RAN WG1 Meeting #86bis, Lisbon, Portugal, Oct. 10-14, 2016, R1-1608598, XP51148657, 6 Pages.
International Preliminary Reporton Patentability, PCT/EP2017/084142, dated Mar. 16, 2020, 16 Pages.
ITU-R, "IMT Vision—Framework and overall objectives of the future development of IMT for 2020 and beyond", Recommendation ITU-R M.2083-0, M Series, Mobile, radiodetermination, amateur and related satellite services, Electronic Publication, Geneva, 2015, 21 Pages.
ITU, "Minimum requirements related to technical performance for IMT-2020 radio interface(s)", Radiocommunication Study Groups, Draft New Report ITU-R M.[IMT-2020.TECH PERF REQ], Document 5/40-E, Feb. 22, 2017, 9 Pages.
IEEE, "Part 11: Wireless LAN Medium Access Control (MAC) and Physical Layer (PHY) Specifications", IEEE Std 802.11—2016, 3534 Pages.
Ericsson et al., "Revised Work item on Ultra Reliable Low Latency Communication for LTE", 3GPP TSG RAN Meeting #76, West Palm Beach, USA, Jun. 5-8, 2017, RP-171489, 5 Pages.
Carlo Alberto Boano et al., "Demo Abstract: Generation of Controllable Radio Interference for Protocol Testing in Wireless Sensor Networks", SenSys'09, Nov. 4-6, 2009, Berkeley, CA, USA.

* cited by examiner

TRANSMISSION COORDINATION FOR INTERFERENCE ASSESSMENT

CROSS REFERENCE TO RELATED APPLICATIONS

This application is a 35 U.S.C. § 371 national stage application of PCT International Application No. PCT/EP2017/084142 filed on Dec. 21, 2017, the disclosure and content of which are incorporated by reference herein in their entirety.

TECHNICAL FIELD

The present invention relates to methods for managing radio transmissions and to corresponding apparatuses, computer programs and systems.

BACKGROUND

In radio communication networks, reliability and latency are important aspects. For example, there may be critical data which are subject to both a requirement of low latency and high reliability of transmission from a sender to a receiver. Here, the reliability may be assessed in terms of a probability that data packets are not successfully delivered to the receiver within a specified latency limit, as they are either erroneous, lost, or arrive too late. By specifying a reliability guarantee, it can thus be ensured that data is successfully delivered within specified latency limit. By way of example, 5G (5th Generation) wireless communication networks as currently developed by 3GPP ($3^{rd}$ Generation Partnership Project) shall support URLLC (ultra-reliable and low-latency communications). Use cases of URLLC as for example mentioned in ITU Recommendation ITU-R M.2083-0 (September 2015) include wireless control of industrial manufacturing or production processes, remote medical surgery, distribution automation in a smart grid, transportation safety. Further examples are real-time operation of a smart electrical power grid, or remote control of other real-time operations. According to ITU document DRAFT ITU-R M.[IMT-2020.TECH.PERF REQ], entitled "Minimum requirements related to technical performance for IMT-2020 radio interface(s)" (22 Feb. 2017) a success probability of $1-10^{-5}$ for transmitting a layer 2 PDU (protocol data unit) of 32 bytes within a latency limit of 1 ms is required in a URLLC usage scenario. Also for other radio technologies enhancements are being developed to support URLLC or similar high reliability communication. For example, support of URLLC by the LTE (Long Term Evolution) radio technology specified by 3GPP is discussed in 3GPP document RP-171489, 3GPP TSG RAN Meeting #76, West Palm Beach, USA (June 2017).

Both reliability and latency may be affected by interference. For example, occurrence of interference may result in failure of a radio transmission carrying critical data and necessitate a retransmission to successfully transmit the data. The required retransmission introduces additional delay and may result in non-compliance with the latency requirements. Further, occurrence of interference may even result in failure of a radio transmission carrying critical data and in failure of all attempted retransmissions of the data, resulting in non-compliance with the reliability requirements.

In order to achieve a desired reliability level, a wireless communication system is typically over-dimensioned, e.g., by configuring the wireless communication system to meet the reliability requirements also in a worst-case scenario. However, it is difficult to accurately take into account the effects of interference, which may vary during operation of the wireless communication system. A typical way to address variable interference is to react to a degradation of performance of the wireless communication occurring due to interference by triggering diagnosis and optimization mechanisms, with the aim of increasing robustness of radio transmissions, e.g., by increasing transmit power, by using a lower order modulation scheme, and/or by using coding with a higher redundancy level. However, with such reactive approach it is typically not possible to ensure the desired reliability while the performance degradation occurs.

Accordingly, there is a need for techniques which allow for efficiently ensuring reliable transport of data by radio transmissions which are potentially subject to interference, especially while also keeping latency requirements.

SUMMARY

According to an embodiment, a method of managing radio transmissions is provided. According to the method, during transmission of data by radio transmissions from a first radio device to a second radio device, a third radio device is controlled to transmit an interference signal on radio resources used by the radio transmissions from the first radio device to the second radio device. The transmission of the data is coordinated with transmission of the interference signal, and an effect of the interference signal on the radio transmissions is monitored.

According to a further embodiment, an apparatus for managing radio transmissions is provided. The apparatus is configured to, during transmission of data by radio transmissions from a first radio device to a second radio device, control a third radio device to transmit an interference signal on radio resources used by the radio transmissions from the first radio device to the second radio device. Further, the apparatus is configured to coordinate transmission of the data with transmission of the interference signal. Further, the apparatus is configured to monitor an effect of the interference signal on the radio transmissions.

According to a further embodiment, an apparatus for managing radio transmissions is provided. The apparatus comprises at least one processor and a memory containing instructions executable by said at least one processor, whereby the apparatus is operative to perform the above method. In particular, by execution of the instructions the apparatus is operative to: during transmission of data by radio transmissions from a first radio device to a second radio device, control a third radio device to transmit an interference signal on radio resources used by the radio transmissions from the first radio device to the second radio device; coordinate transmission of the data with transmission of the interference signal; and monitor an effect of the interference signal on the radio transmissions.

According to a further embodiment, a system is provided. The system comprises at least a first radio device, a second radio device, and a third radio device. The first radio device and the second radio device are configured to transmit data by radio transmissions from the first radio device to the second radio device. The third radio device is configured to transmit an interference signal on radio resources used by the radio transmissions from the first radio device to the second radio device. At least one of the first radio device, second radio device, and the third radio device is configured to coordinate transmission of the data with transmission of the interference signal. At least one of the first radio device, the second radio device, and the third radio device is configured to monitor an effect of the interference signal on the radio transmissions.

According to a further embodiment of the invention, a computer program or computer program product is provided, e.g., in the form of a non-transitory storage medium, which comprises program code to be executed by at least one processor of an apparatus for managing radio transmissions. Execution of the program code causes the apparatus to, during transmission of data by radio transmissions from a first radio device to a second radio device, control a third radio device to transmit an interference signal on radio resources used by the radio transmissions from the first radio device to the second radio device. Further, execution of the program code causes the apparatus to coordinate transmission of the data with transmission of the interference signal. Further, execution of the program code causes the apparatus to monitor an effect of the interference signal on the radio transmissions.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to handling of congestions in a communication network. In the illustrated examples, it is assumed that the communication network is a wireless communication network, e.g., based on the LTE (Long Term Evolution) radio access technology specified by 3GPP ($3^{rd}$ Generation Partnership Project) or on the 5G ($5^{th}$ Generation) radio access technology currently developed by 3GPP. However, it is noted that other radio technologies could be used as well, e.g., WLAN (Wireless Local Area Network).

In the illustrated examples, a wireless communication network is assumed which includes a plurality of radio devices, in particular one or more access nodes and a plurality of wireless devices which communicate by radio transmissions with the access nodes. However, it is noted that a deployment without access nodes, where the wireless stations communicated directly with each other, e.g., using an infrastructureless, ad-hoc, or mesh-type communication mode, could be utilized as well. In the illustrated concepts, effects of interference may be assessed during regular operation of the wireless communication network, by generating interference in a controlled manner. While data is being transmitted by radio transmissions from a first radio device to a second radio device, i.e., during transmission of data from the first radio device to the second radio device, a third radio device is controlled to transmit an interference signal on radio resources used for the radio transmissions from the first radio device to the second radio device, and the effect of the interference signal on the radio transmissions from the first radio device to the second radio device is monitored. The interference signal may be generated to emulate potential real world interference. The transmission of the data is coordinated with the transmission of the interference signal. In this way, adverse effects of the transmission of the interference signal on the transmission of data can be avoided. In particular, it can be avoided that the transmission of the interference signal causes excessive delay or loss of a data transmission. Accordingly, a reliability guarantee can be met irrespective of the interference signal.

The coordination may for example involve early scheduling of a retransmission. That is to say, when scheduling one of the radio transmissions conveying at least a part of the data from the first radio device to the second radio device, also a retransmission of this part of the data may be scheduled. Accordingly, even if the transmission of the interference signal results in the initial transmission of the part of the data being unsuccessful, the scheduled retransmission can ensure that the part of the data is successfully transmitted without excessive delay. In addition or as an alternative, the coordination may also involve performing a dummy transmission, i.e., a radio transmission which is not used for conveying the data or other useful information, on the radio resources on which the third radio device transmits the interference signal. In this case, if the initial transmission of the part of the data is unsuccessful due to the presence of the interference signal, there is still no adverse effect of the transmission of data, because the dummy transmission is not used for conveying the data.

Figure 1:
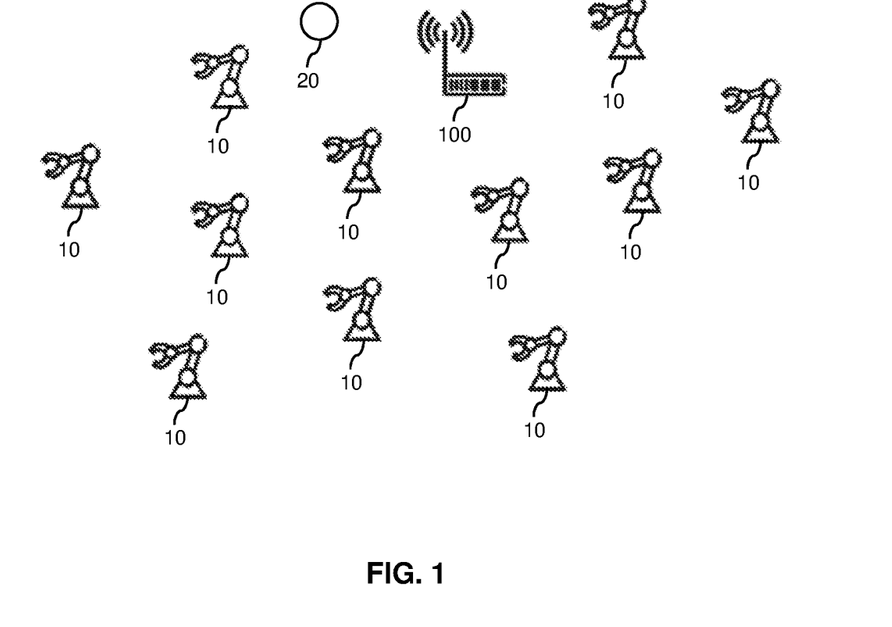
FIG. 1 schematically illustrates elements of a wireless communication system according to an embodiment of the invention.

FIG. 1 shows an example of a wireless communication system in which the concepts as outlined above may be implemented. In the example of FIG. 1, a factory environment is assumed, in which machines are controlled through the wireless communication network, e.g., using a centralized controller. In the example of FIG. 1, the wireless communication network includes radio devices in the form of an access point 100 and wireless devices 10 attached to or otherwise associated with the machines. The wireless devices 10 may for example correspond to sensors and/or remote controlled actuators of the machines. As further illustrated, an interferer device 20 is provided, which is used to transmit the interference signal. The interferer device 20 may be one of the wireless devices 10, which is configured and controlled to transmit the interference signal. However, the interferer device 20 could also be implemented by an access point or by a test device which is dedicated to transmission of the interference signal.

Figure 2:
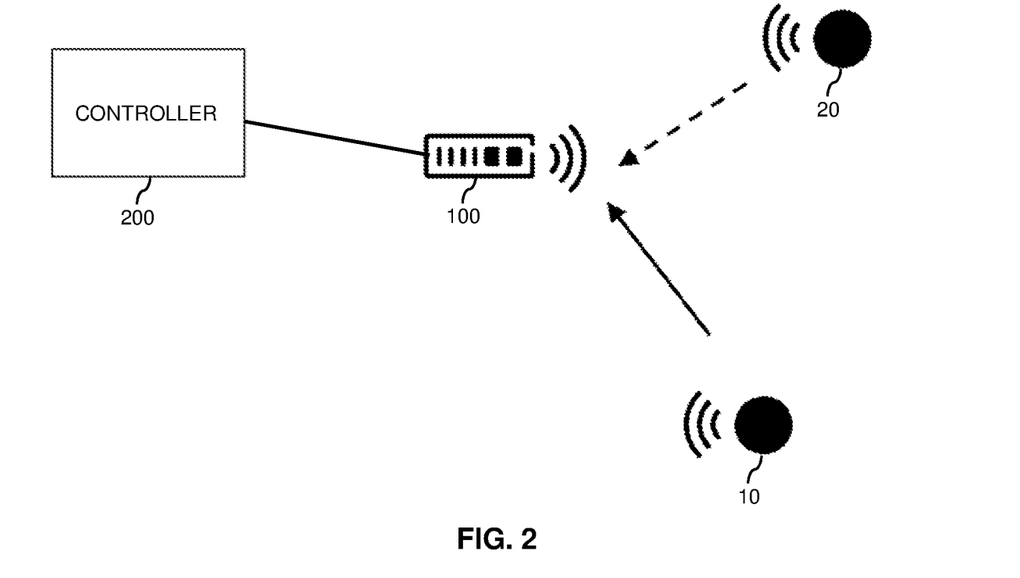
FIG. 2 illustrates an exemplary scenario in which effects of interference are assessed according to an embodiment of the invention.

FIG. 2 schematically illustrates a scenario in which effects of interference are assessed as outlined above. The scenario of FIG. 2 involves one of the wireless devices 10, the access point 100, the interferer device 20, and a controller 200. In the example of FIG. 2, it is assumed that the controller 200 is responsible for the coordination of the transmission of the data with the transmission of the interference signal and for monitoring the effects of interference. As mentioned above, the interferer device 20 could be another one of the wireless devices 10, another access point, or a dedicated test device.

In the scenario of FIG. 2, it is assumed that the wireless device 10 uses radio transmissions (illustrated by a solid arrow) to convey data to the access point 100. The interferer device 20 is controlled to transmit the interference signal (illustrated by a dashed arrow) on the radio resources used by these radio transmissions from the wireless device 10 to the access point 100. The controller 200 may for example control the interferer device 20 to transmit the interference signal in the same time slot and on the same frequency resources as used for the radio transmissions from the wireless device 10 to the access point 100. However, it is noted that in some cases transmission of the interference signal could also be controlled to occur in time resources which only partially overlap the time slot used for the radio transmissions from the wireless device 10 to the access point 100, on partially overlapping frequency resources, and/or on neighboring frequency resources. The controller 200 may also control transmission power, transmission bandwidth, and/or an antenna configuration applied for transmission of the interference signal. In some scenarios, the controller 200 may also control a position of the interferer device 20 when transmitting the interference signal and/or an angle at which the interference signal is transmitted. For example, the interferer device could be attached to or otherwise associated with a robotic machine, and the position of the interferer device 20 when transmitting the interference signal and/or an angle at which the interference signal is transmitted could be controlled by moving the robotic machine.

The access point 100 receives the radio transmissions and measures reception quality of the received radio transmissions. This may for example involve determining whether the radio transmissions can be successfully decoded and/or measuring an SNR (Signal to Noise Ratio), SINR (Signal to Interference plus Noise Ratio), or similar signal quality indicator. The access point 100 sends one or more reports of the measured reception quality to the controller 200. Based on the report(s), the controller 200 monitors the effects of interference, e.g., by checking if the interference signal causes an excessive degradation of the reception quality. Based on the monitored effects of interference, the controller 200 may then optimize the radio transmissions from the wireless device 10 to the access point 100, e.g., by selecting a higher transmit power or more robust modulation and coding scheme in response to detecting an excessive degradation of the reception quality.

Figure 3:
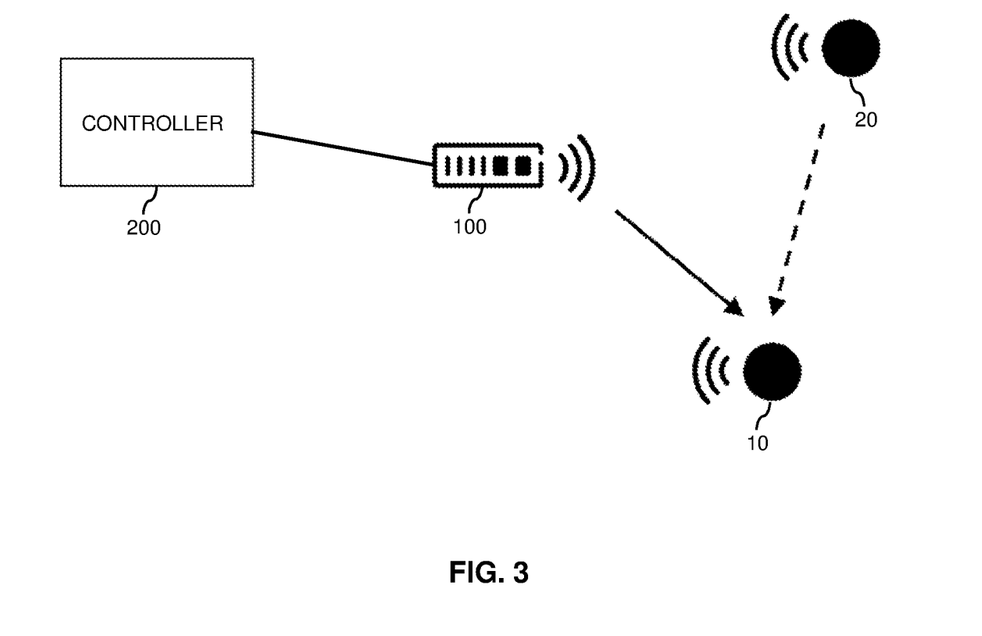
FIG. 3 illustrates a further exemplary scenario in which effects of interference are assessed according to an embodiment of the invention.

FIG. 3 schematically illustrates a further scenario in which effects of interference are assessed as outlined above. The scenario of FIG. 3 involves one of the wireless devices 10, the access point 100, the interferer device 20, and a controller 200. Also in the example of FIG. 3, it is assumed that the controller 200 is responsible for the coordination of the transmission of the data with the transmission of the interference signal and for monitoring the effects of interference. As mentioned above, the interferer device 20 could be another one of the wireless devices 10, another access point, or a dedicated test device.

In the scenario of FIG. 3, it is assumed that the access point 100 uses radio transmissions (illustrated by a solid arrow) to convey data to the wireless device 10. The interferer device 20 is controlled to transmit the interference signal (illustrated by a dashed arrow) on the radio resources used by these radio transmissions from the access point 100 to the wireless device 10. The controller 200 may for example control the interferer device 20 to transmit the interference signal in the same time slot and on the same frequency resources as used for the radio transmissions from the access point 100 to the wireless device 10. However, it is noted that in some cases transmission of the interference signal could also be controlled to occur in time resources which only partially overlap the time slot used for the radio transmissions from the wireless device 10 to the access point 100, on partially overlapping frequency resources, and/or on neighboring frequency resources. The controller 200 may also control transmission power, transmission bandwidth, and/or an antenna configuration applied for transmission of the interference signal. In some scenarios, the controller 200 may also control a position of the interferer device 20 when transmitting the interference signal and/or an angle at which the interference signal is transmitted. For example, the interferer device could be attached to or otherwise associated with a robotic machine, and the position of the interferer device 20 when transmitting the interference signal and/or an angle at which the interference signal is transmitted could be controlled by moving the robotic machine.

The wireless device 10 receives the radio transmissions and measures reception quality of the received radio transmissions. This may for example involve determining whether the radio transmissions can be successfully decoded and/or measuring an SNR, SINR, or similar signal quality indicator. The wireless device 10 sends one or more reports of the measured reception quality to the controller 200. This may be accomplished via the access point 100. However, other ways of providing the report(s) to the controller 200 could be considered as well, e.g., using another wireless connection, a temporary wired connection or transfer via a storage device, such as a USB (Universal Serial Bus) storage device. Based on the report(s), the controller 200 monitors the effects of interference, e.g., by checking if the interference signal causes an excessive degradation of the reception quality. Based on the monitored effects of interference, the controller 200 may then optimize the radio transmissions from the access point 100 to the wireless device 10, e.g., by selecting a higher transmit power or more robust modulation and coding scheme in response to detecting an excessive degradation of the reception quality.

Figure 4:
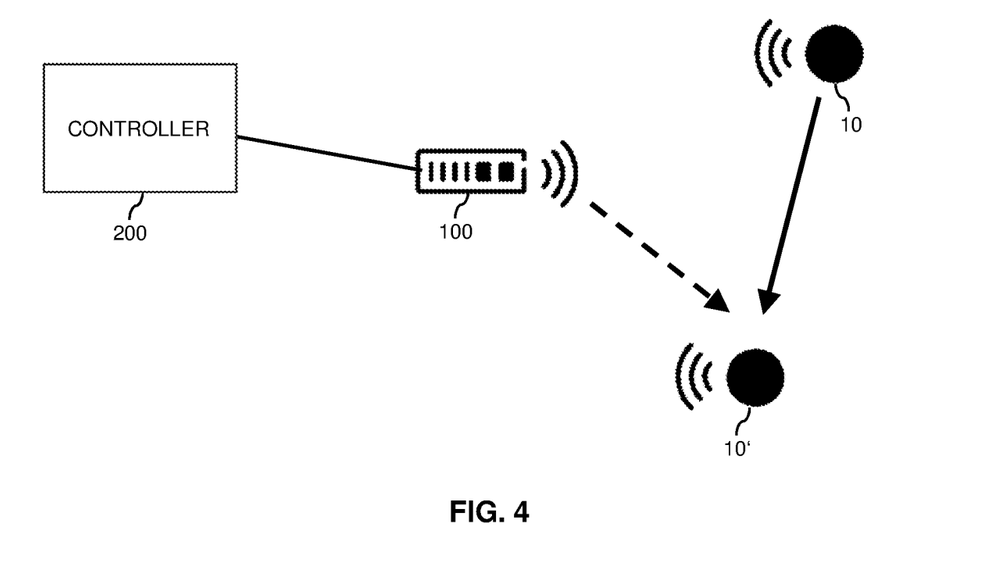
FIG. 4 illustrates a further exemplary scenario in which effects of interference are assessed according to an embodiment of the invention.

FIG. 4 schematically illustrates a further scenario in which effects of interference are assessed as outlined above. The scenario of FIG. 4 involves two of the wireless devices 10, in the following referred to as first wireless device 10 and second wireless device 10', the access point 100, and a controller 200. Also in the example of FIG. 4, it is assumed that the controller 200 is responsible for the coordination of the transmission of the data with the transmission of the interference signal and for monitoring the effects of interference. In the example of FIG. 4, the access point 100 transmits the interference signal, i.e., acts as an interferer device.

In the scenario of FIG. 4, it is assumed that the first wireless device 10 uses radio transmissions (illustrated by a solid arrow) to convey data to the second wireless device 10'. The access point 100 is controlled to transmit the interference signal (illustrated by a dashed arrow) on the radio resources used by these radio transmissions from the first wireless device 10 to the second wireless device 10'. The controller 200 may for example control the access point 100 to transmit the interference signal in the same time slot and on the same frequency resources as used for the radio transmissions from the first wireless device 10 to the second wireless device 10'. However, it is noted that in some cases transmission of the interference signal could also be controlled to occur in time resources which only partially overlap the time slot used for the radio transmissions from the wireless device 10 to the access point 100, on partially overlapping frequency resources, and/or on neighboring frequency resources.

The second wireless device 10' receives the radio transmissions and measures reception quality of the received radio transmissions. This may for example involve determining whether the radio transmissions can be successfully decoded and/or measuring an SNR, SINR, or similar signal quality indicator. The second wireless device 10' sends one or more reports of the measured reception quality to the controller 200. This may be accomplished via the access point 100. However, other ways of providing the report(s) to the controller 200 could be considered as well, e.g., using another wireless connection, a temporary wired connection or transfer via a storage device, such as a USB storage device. Based on the report(s), the controller 200 monitors the effects of interference, e.g., by checking if the interference signal causes an excessive degradation of the reception quality. Based on the monitored effects of interference, the controller 200 may then optimize the radio transmissions from the first wireless device 10 to the second wireless device 10', e.g., by selecting a higher transmit power or more robust modulation and coding scheme in response to detecting an excessive degradation of the reception quality.

Figure 5:
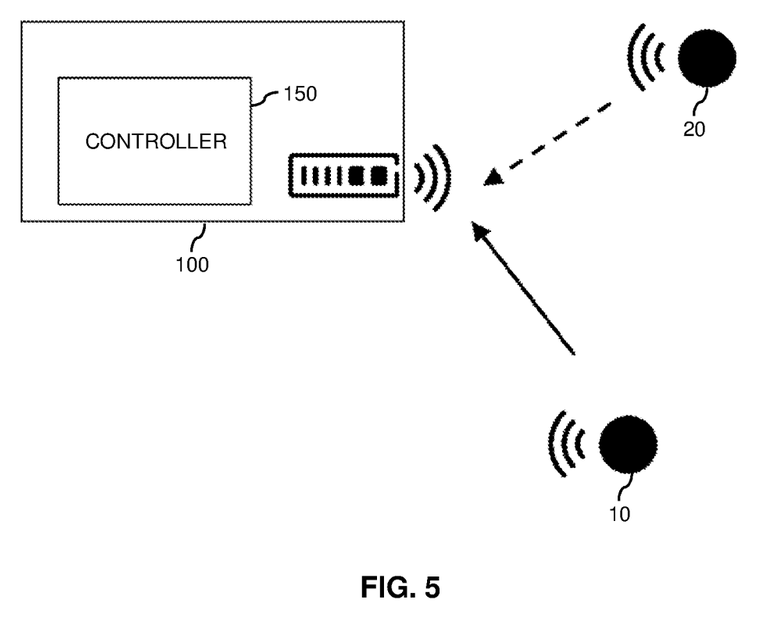
FIG. 5 illustrates a further exemplary scenario in which effects of interference are assessed according to an embodiment of the invention.

FIG. 5 schematically illustrates a further scenario in which effects of interference are assessed as outlined above. The scenario of FIG. 5 involves one of the wireless devices 10, the access point 100, and the interferer device 20. In the example of FIG. 5, it is assumed that the access point 100 is provided with a controller 150 that is responsible for the coordination of the transmission of the data with the transmission of the interference signal and for monitoring the effects of interference. As mentioned above, the interferer device 20 could be another one of the wireless devices 10, another access point, or a dedicated test device.

In the scenario of FIG. 5, it is assumed that the wireless device 10 uses radio transmissions (illustrated by a solid arrow) to convey data to the access point 100. The interferer device 20 is controlled to transmit the interference signal (illustrated by a dashed arrow) on the radio resources used by these radio transmissions from the wireless device 10 to the access point 100. The controller 150 may for example control the interferer device 20 to transmit the interference signal in the same time slot and on the same frequency resources as used for the radio transmissions from the wireless device 10 to the access point 100. However, it is noted that in some cases transmission of the interference signal could also be controlled to occur in time resources which only partially overlap the time slot used for the radio transmissions from the wireless device 10 to the access point 100, on partially overlapping frequency resources, and/or on neighboring frequency resources. The controller 150 may also control transmission power, transmission bandwidth, and/or an antenna configuration applied for transmission of the interference signal. In some scenarios, the controller 150 may also control a position of the interferer device 20 when transmitting the interference signal and/or an angle at which the interference signal is transmitted. For example, the interferer device could be attached to or otherwise associated with a robotic machine, and the position of the interferer device 20 when transmitting the interference signal and/or an angle at which the interference signal is transmitted could be controlled by moving the robotic machine.

The access point 100 receives the radio transmissions and measures reception quality of the received radio transmissions. This may for example involve determining whether the radio transmissions can be successfully decoded and/or measuring an SNR, SINR, or similar signal quality indicator. Based on the measured reception quality, the controller 150 monitors the effects of interference, e.g., by checking if the interference signal causes an excessive degradation of the reception quality. Based on the monitored effects of interference, the controller 150 may then optimize the radio transmissions from the wireless device 10 to the access point 100, e.g., by selecting a higher transmit power or more robust modulation and coding scheme in response to detecting an excessive degradation of the reception quality.

Figure 6:
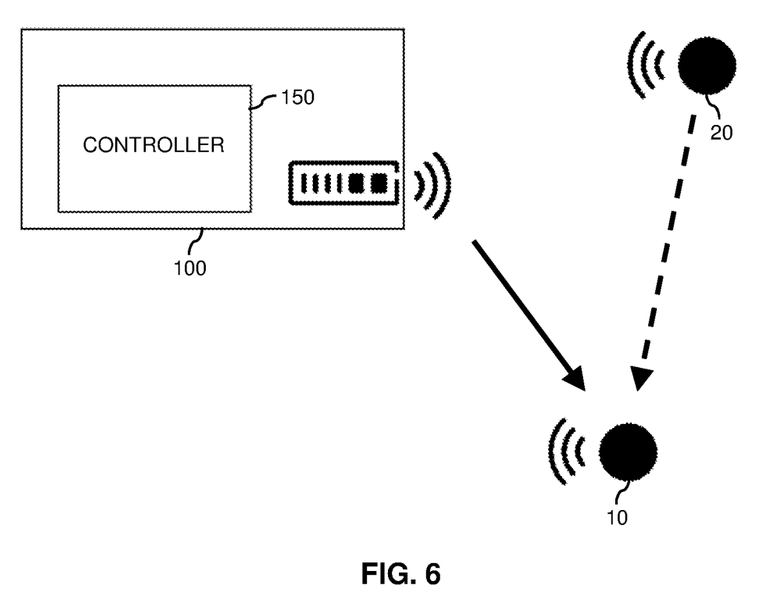
FIG. 6 illustrates a further exemplary scenario in which effects of interference are assessed according to an embodiment of the invention.

FIG. 6 schematically illustrates a further scenario in which effects of interference are assessed as outlined above. The scenario of FIG. 6 involves one of the wireless devices 10, the access point 100, and the interferer device 20. Also in the example of FIG. 6, it is assumed that the access point 100 is provided with a controller 150 that is responsible for the coordination of the transmission of the data with the transmission of the interference signal and for monitoring the effects of interference. As mentioned above, the interferer device 20 could be another one of the wireless devices 10, another access point, or a dedicated test device.

In the scenario of FIG. 6, it is assumed that the access point 100 uses radio transmissions (illustrated by a solid arrow) to convey data to the wireless device 10. The interferer device 20 is controlled to transmit the interference signal (illustrated by a dashed arrow) on the radio resources used by these radio transmissions from the access point 100 to the wireless device 10. The controller 150 may for example control the interferer device 20 to transmit the interference signal in the same time slot and on the same frequency resources as used for the radio transmissions from the access point 100 to the wireless device 10. However, it is noted that in some cases transmission of the interference signal could also be controlled to occur in time resources which only partially overlap the time slot used for the radio transmissions from the wireless device 10 to the access point 100, on partially overlapping frequency resources, and/or on neighboring frequency resources. The controller 150 may also control transmission power, transmission bandwidth, and/or an antenna configuration applied for transmission of the interference signal. In some scenarios, the controller 150 may also control a position of the interferer device 20 when transmitting the interference signal and/or an angle at which the interference signal is transmitted. For example, the interferer device could be attached to or otherwise associated with a robotic machine, and the position of the interferer device 20 when transmitting the interference signal and/or an angle at which the interference signal is transmitted could be controlled by moving the robotic machine.

The wireless device 10 receives the radio transmissions and measures reception quality of the received radio transmissions. This may for example involve determining whether the radio transmissions can be successfully decoded and/or measuring an SNR, SINR, or similar signal quality indicator. The wireless device 10 sends one or more reports of the measured reception quality to the controller 150 in the access point 100. Based on the report(s), the controller 150 monitors the effects of interference, e.g., by checking if the interference signal causes an excessive degradation of the reception quality. Based on the monitored effects of interference, the controller 150 may then optimize the radio transmissions from the access point 100 to the wireless device 10, e.g., by selecting a higher transmit power or more robust modulation and coding scheme in response to detecting an excessive degradation of the reception quality.

Figure 7:
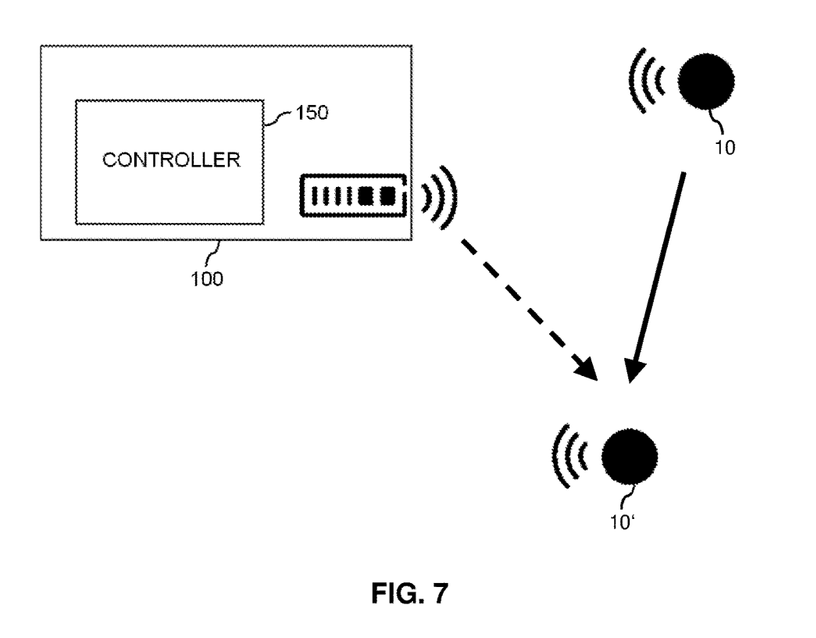
FIG. 7 illustrates a further exemplary scenario in which effects of interference are assessed according to an embodiment of the invention.

FIG. 7 schematically illustrates a further scenario in which effects of interference are assessed as outlined above. The scenario of FIG. 7 involves two of the wireless devices 10, in the following referred to as first wireless device 10 and second wireless device 10', and the access point 100. Also in the example of FIG. 7, it is assumed that the access point 100 is provided with a controller 150 that is responsible for the coordination of the transmission of the data with the transmission of the interference signal and for monitoring the effects of interference. In the example of FIG. 7, the access point 100 transmits the interference signal, i.e., acts as an interferer device.

In the scenario of FIG. 7, it is assumed that the first wireless device 10 uses radio transmissions (illustrated by a solid arrow) to convey data to the second wireless device 10'. The access point 100 is controlled to transmit the interference signal (illustrated by a dashed arrow) on the radio resources used by these radio transmissions from the first wireless device 10 to the second wireless device 10'. The controller 150 may for example control the access point 100 to transmit the interference signal in the same time slot and on the same frequency resources as used for the radio transmissions from the first wireless device 10 to the second wireless device 10'. However, it is noted that in some cases transmission of the interference signal could also be controlled to occur in time resources which only partially overlap the time slot used for the radio transmissions from the wireless device 10 to the access point 100, on partially overlapping frequency resources, and/or on neighboring frequency resources.

The second wireless device 10' receives the radio transmissions and measures reception quality of the received radio transmissions. This may for example involve determining whether the radio transmissions can be successfully decoded and/or measuring an SNR, SINR, or similar signal quality indicator. The second wireless device 10 sends one or more reports of the measured reception quality to the controller 150 in the access point 100. Based on the report(s), the controller 150 monitors the effects of interference, e.g., by checking if the interference signal causes an excessive degradation of the reception quality. Based on the monitored effects of interference, the controller 150 and may then optimize the radio transmissions from the first wireless device 10 to the second wireless device 10', e.g., by selecting a higher transmit power or more robust modulation and coding scheme in response to detecting an excessive degradation of the reception quality.

As can be seen from the exemplary scenarios of FIGS. 2 to 7, in the illustrated concepts the effects of interference may be assessed by configuring and controlling the transmission of the interference signal by the interferer device to occur during transmission of data by radio transmissions from a first radio device, in the following also referred to as tested transmitter, to the second radio device, in the following also referred to as tested receiver. Configuration and control of the transmission of the interference signal by the interferer device may be accomplished by one of the radio devices, e.g., by the access point 100 of the examples of FIG. 5 to 7, or by a controller which is separate from the radio devices, such as the controller 200 of the examples of FIGS. 2 to 4. Further, similar to the access point 100 of the examples of FIGS. 5 to 7, also one or more of the wireless devices 10 or the interferer device 20 may be provided with a controller which configures and controls the transmission of the interference signal.

Figure 8:
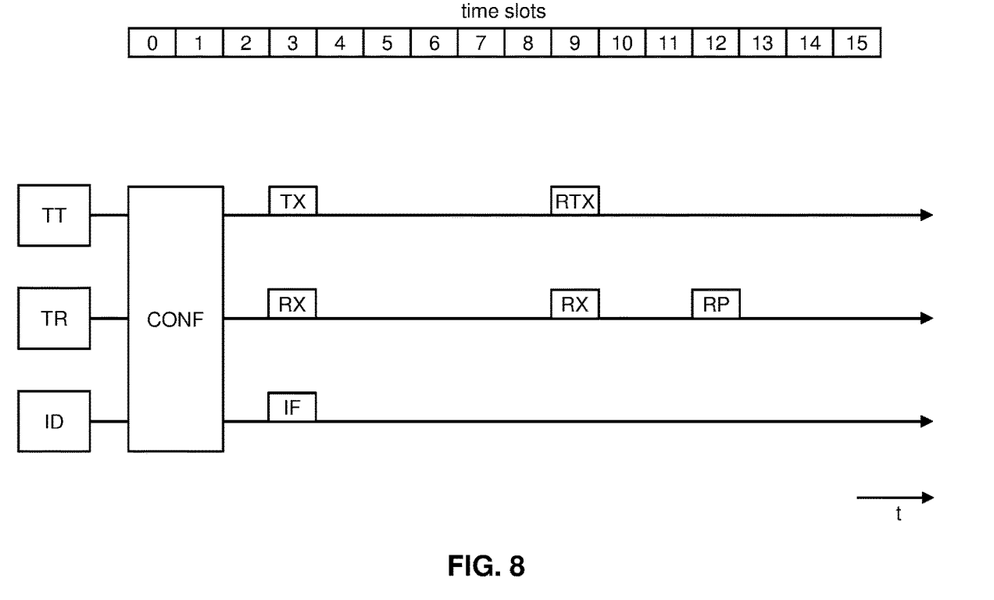
FIG. 8 illustrates an example of coordinating transmission of data with transmission of an interference signal according to an embodiment of the invention.

As mentioned above, the transmission of the interference signal is coordinated with the transmission of the data from the tested transmitter to the tested receiver. FIG. 8 illustrates an example in which this coordination is accomplished by early scheduling of a retransmission from the tested transmitter (TT) to the tested receiver (TR). In the example of FIG. 8, it is assumed that the radio transmissions in the wireless communication system are organized in time slots. FIG. 8 illustrates a sequence of time slots, denoted by index values from 0 to 15, arranged from left to right in the order of time t.

As illustrated, one or more of the time slots may be used for configuration (CONF) of the tested transmitter, the tested receiver, and the interferer device (ID). This configuration may for example involve configuring transmission power, transmission bandwidth, transmission frequency, transmission timing, and/or an antenna configuration applied for transmission of the interference signal by the interferer device. In some scenarios, the configuration may also involve configuring a position of the interferer device and/or an angle at which the interference signal is transmitted. In the example of FIG. 8, the transmission of the interference signal is configured to occur in the time slot with index 3. Further, the example of FIG. 8 assumes that the configuration involves scheduling a radio transmission conveying data from the tested transmitter to the tested receiver and also scheduling a retransmission of these data. In the example of FIG. 8, the initial transmission of the data is scheduled in the time slot with index 3, and the retransmission of the data is scheduled in the time slot with index 9. However, it is noted that this timing is merely an example. In order to meet a latency guarantee, the initial transmission of the data and the retransmission may be scheduled within a time window which does not exceed the guaranteed latency. The configuration may be accomplished by sending management information to the tested transmitter, tested receiver, and/or the interferer device. The management information may for example instruct the interferer device to transmit the interference signal in the time slot with index 3, instruct the tested transmitter to transmit the initial radio transmission conveying the data in the time slot with index 3, and instruct the tested transmitter to perform the retransmission of the data in the time slot with index 9. The management information may also inform the tested receiver that a radio transmission conveying data is to be expected in the time slots with index 3 and a retransmission is to be expected in the time slot with index 9. Further, the management information may instruct the tested receiver to measure the reception quality of the radio transmission in the time slot with index 3 and optionally also in the time slot with index 9. The management information may be conveyed by one or more radio transmissions, such as a radio transmission from the access point 100 to the wireless devices 10 or interferer device 20, and/or by a wire based transmission, such as by a wire-based transmission from the controller 200 to the access point 100.

In accordance with the configuration, in the time slot with index 3 the tested transmitter sends the radio transmission conveying the data, as indicated by TX, and the tested receiver receives this radio transmission, as indicated by RX. At the same time, the interferer device sends the interference signal, as indicated by IF. The tested receiver also measures the reception quality of the received radio transmission, e.g., by checking if the radio transmission can be successfully decoded and/or by measuring an SNR, SINR or similar quality indicator. As indicated by RTX, the tested transmitter then performs the scheduled retransmission, and the tested receiver receives the retransmission. Here, it is noted that the tested transmitter performs the retransmission irrespective of any feedback from the tested receiver. That is to say, rather than being triggered by feedback from the tested receiver, the retransmission is preconfigured. The tested receiver may also measure the reception quality of the received retransmission, e.g., by checking if the retransmission can be successfully decoded and/or by measuring an SNR, SINR or similar quality indicator. Since the interferer device is configured to not transmit the interference signal in the time slot of the scheduled retransmission, measuring the reception quality of the retransmission may allow for a more accurate assessment of the effects of interference, by comparing the reception quality when the interference signal is present (in time slot with index 3) and the reception quality when the interference signal is not present (in time slot with index 9). As indicated by RP, the tested receiver may then report the measured reception quality.

Figure 9:
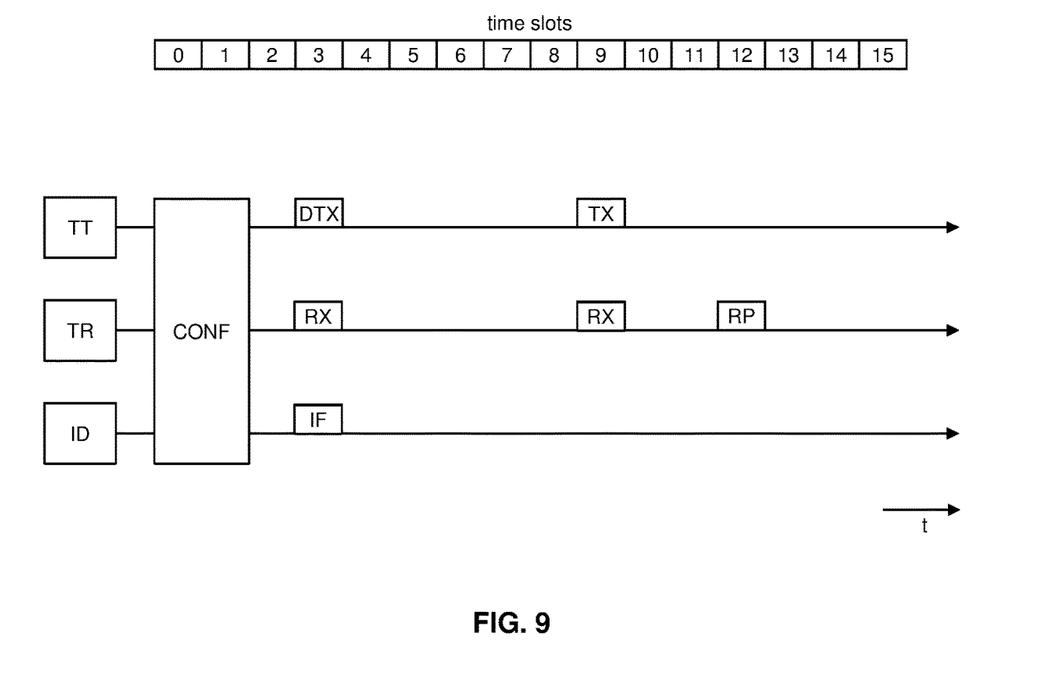
FIG. 9 illustrates a further example of coordinating transmission of data with transmission of an interference signal according to an embodiment of the invention.

FIG. 9 illustrates a further example in which the coordination of the transmission of data with the transmission of the interference signal involves configuring a dummy transmission (DTX) from the tested transmitter (TT) to the tested receiver (TR). Also in the example of FIG. 9, it is assumed that the radio transmissions in the wireless communication system are organized in time slots. FIG. 9 illustrates a sequence of time slots, denoted by index values from 0 to 15, arranged from left to right in the order of time t.

As illustrated, one or more of the time slots may be used for configuration (CONF) of the tested transmitter, the tested receiver, and the interferer device (ID). This configuration may for example involve configuring transmission power, transmission bandwidth, transmission frequency, transmission timing, and/or an antenna configuration applied for transmission of the interference signal by the interferer device. In some scenarios, the configuration may also involve configuring a position of the interferer device and/or an angle at which the interference signal is transmitted. In the example of FIG. 9, the transmission of the interference signal (IF) is configured to occur in the time slot with index 3. Further, the example of FIG. 9 assumes that the configuration involves configuring a radio transmission in the time slot to be used for transmission of the interference signal as a dummy transmission, i.e., as a radio transmission not used for conveying the data from the tested transmitter to the tested receiver. The dummy transmission is configured in addition to the regular radio transmissions used for conveying the data. The dummy transmission may emulate a regular radio transmission used for conveying data, and may for example include padding or a predefined pattern in place of the data. The configuration may be accomplished by sending management information to the tested transmitter, tested receiver, and/or the interferer device. The management information may for example instruct the interferer device to transmit the interference signal in the time slot with index 3, instruct the tested transmitter to transmit the dummy transmission in the time slot with index 3, and inform the tested receiver that a dummy transmission is to be expected in the time slot with index 3. The management information may also inform the tested receiver that a radio transmission conveying data is to be expected in the time slot with index 9. Further, the management information may instruct the tested receiver to measure the reception quality of the dummy transmission in the time slot with index 3 and to optionally measure the reception quality of the radio transmission conveying data in time slot 9. It is noted that the timing assumed in the scenario of FIG. 9 is merely an example, and that other time slots could be used for transmission of the interference signal and dummy transmission and for transmission of the regular radio transmission conveying the data. The management information may be conveyed by one or more radio transmissions, such as a radio transmission from the access point 100 to the wireless devices 10 or interferer device 20, and/or by a wire based transmission, such as by a wire-based transmission from the controller 200 to the access point 100.

In accordance with the configuration, in the time slot with index 3 the tested transmitter sends the dummy transmission, as indicated by DTX, and the tested receiver receives the dummy transmission, as indicated by RX. At the same time, the interferer device sends the interference signal, as indicated by IF. The tested receiver also measures the reception quality of the received radio transmission, e.g., by checking if the dummy transmission can be successfully decoded, by checking if the received dummy transmission corresponds to expected characteristics, e.g., if it has the above-mentioned padding or predefined pattern in place of the data, and/or by measuring an SNR, SINR or similar quality indicator. As indicated by TX, the tested transmitter then performs the regular radio transmission conveying the data, and the tested receiver receives this radio transmission. The tested receiver may also measure the reception quality of the received regular radio transmission, e.g., by checking if the regular radio transmission can be successfully decoded and/or by measuring an SNR, SINR or similar quality indicator. Since the interferer device is configured to not transmit the interference signal in the time slot of the regular radio transmission retransmission, measuring the reception quality of the regular radio transmission may allow for a more accurate assessment of the effects of interference, by comparing the reception quality when the interference signal is present (in time slot with index 3) and the reception quality when the interference signal is not present (in time slot with index 9). As indicated by RP, the tested receiver may then report the measured reception quality.

Figure 10:
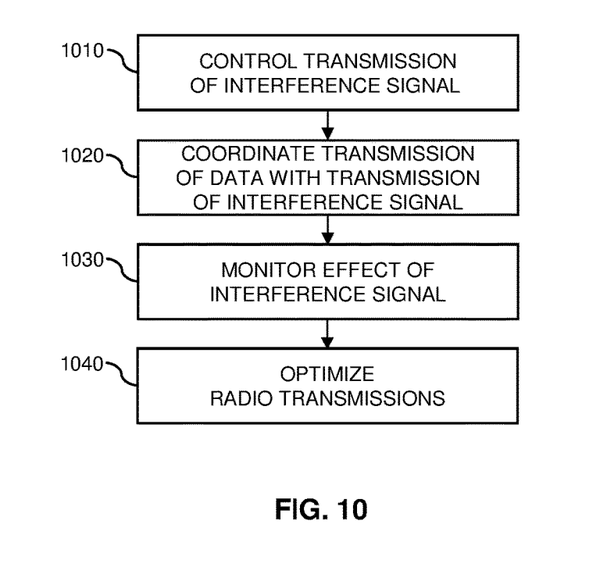
FIG. 10 shows a flowchart for schematically illustrating a method of managing radio transmissions according to an embodiment of the invention.

FIG. 10 shows a flowchart for illustrating a method of controlling radio transmissions, which may be utilized for implementing the illustrated concepts. At least a part of the method may be implemented in a radio device, such as one of the wireless devices 10, the interferer device 20, or the access point 100, or in an apparatus for controlling radio devices, such as in the controller 200. In some scenarios, the method may also be implemented in a distributed manner in a system formed of multiple radio devices or in a system formed of multiple radio devices and an apparatus for controlling the radio devices. If a processor-based implementation of such apparatus is used, at least some of the steps of the method may be performed and/or controlled by one or more processors of the apparatus. Such apparatus may also include a memory storing program code for implementing at least some of the below described functionalities or steps of the method.

At step 1010, transmission of an interference signal is controlled. Specifically, during transmission of data by radio transmissions from a first radio device to a second radio device, a third radio device is controlled to transmit the interference signal on radio resources used by the radio transmissions from the first radio device to the second radio device. Transmission of the interference signal may be controlled to occur on the same time resources, e.g., the same time slot, as used by the radio a first radio device to a second radio device. However, in some cases transmission of the interference signal could also be controlled to occur in time resources which only partially overlap the time slot used for the radio transmissions from the first radio device to the second radio device. Similarly, transmission of the interference signal may be controlled to occur on the same frequency resources, e.g., the same carrier frequency, as used by the radio a first radio device to a second radio device. However, in some cases transmission of the interference signal could also be controlled to occur on frequency resources which only partially overlap the frequency resources used for the radio transmissions from the first radio device to the second radio device, and/or on neighboring frequency resources.

The controlling of the third radio device at step 1010 may involve configuring a transmission power of the interference signal, a transmission frequency of the interference signal, a transmission timing of the interference signal, and/or a transmission bandwidth of the interference signal. In addition or as an alternative, the controlling of step 1010 may involve controlling a position of the third radio device and/or controlling a transmission direction of the interference signal, e.g., by controlling a robotic machine to which the third radio device is attached or otherwise associated.

At step 1020, the transmission of the data is coordinated with transmission of the interference signal. This coordination may involve that a radio device control its own transmissions, that a radio device or control apparatus actively controls transmissions by one or more other radio device(s), or that a radio device is being controlled based on received management information. Accordingly, the coordination of step 1020 may be based on management information provided to at least one of the first radio device, the second radio device, and the third radio device. In scenarios like illustrated in FIGS. 2 to 4, the management information can be provided by a control device or apparatus which is separate from the first radio device, the second radio device, and the third radio device, such as the above-mentioned controller. In scenarios like illustrated in FIGS. 5 to 7, the management information can be provided by one of the first radio device, the second radio device, or the third radio device.

As for example explained in connection with FIG. 8, the coordination of step 1020 may be based on scheduling. In particular, when scheduling a radio transmission on the radio resources on which the third radio device transmits the interference signal, also a retransmission of data conveyed by the radio transmission may be scheduled. Accordingly, the retransmission may be scheduled early, thereby avoiding that excessive latency is introduced in case the interference signal transmitted at step 1010 results in that a radio transmission conveying at least a part of the data from the first radio device to the second radio device is unsuccessful. The retransmission may be scheduled on other radio resources, on which the third radio device does not transmit an interference signal, e.g., in another time slot as explained in the example of FIG. 8.

In addition or as an alternative, the coordination of step 1020 may involve configuring at least one of the radio transmissions, which is performed on the radio resources on which the third radio device transmits the interference signal, as a dummy transmission. The dummy transmission is not used for conveying the data from the first radio device to the second radio device, i.e., does not have the purpose of conveying useful information, but is dedicated for testing purposes. In the case of configuring the dummy transmission, the coordination of step 1020 may also involve providing the second radio device with information on characteristics of the dummy transmission, e.g., on when the dummy transmission is to be expected or on a predefined pattern or padding included in the dummy transmission in place of the data.

At step 1030, an effect of the interference signal on the radio transmissions is monitored. This monitoring of the effect of the interference signal on the radio transmissions may involve monitoring of reception quality of the radio transmission(s) on the radio resources on which the third radio device transmits the interference signal. The monitoring may be based on measurements of the reception quality by the second radio device. The second radio device may provide at least one report of such measurements, and the monitoring may be performed by another one of the radio devices or by a separate control device or apparatus, based on the at least one report provided by the second radio device. Accordingly, the monitoring of the effect of the interference signal on the radio transmissions may be based on at least one report provided by the second radio device.

In the above case of scheduling a retransmission, the monitoring of the effect of the interference signal on the radio transmissions may also involve monitoring of reception quality of the retransmission. Also in this case, the monitoring may be based on measurements of the reception quality by the second radio device or a report of the measured reception quality provided by the second radio device.

In the above case of configuring a dummy transmission, the monitoring of the effect of the interference signal on the radio transmissions may involve monitoring of reception quality of the dummy transmission. Also in this case, the monitoring may be based on measurements of the reception quality by the second radio device or a report of the measured reception quality provided by the second radio device.

At step 1040, the radio transmissions may be optimized based on the monitoring of step 1030. This optimization may for example involve controlling one or more link adaptation parameters of the radio transmissions, e.g., by selecting a higher transmit power or more robust modulation and coding scheme in response to detecting an excessive degradation of the reception quality.

Figure 11:
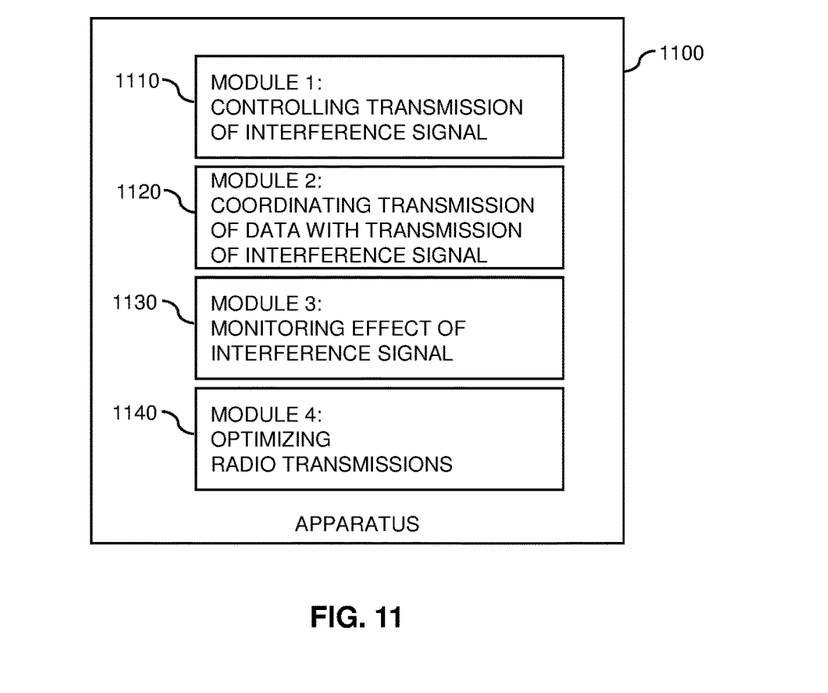
FIG. 11 shows a block diagram for illustrating functionalities of an apparatus according to an embodiment of the invention.

FIG. 11 shows a block diagram for illustrating functionalities of an apparatus 1100 which operates according to the method of FIG. 10. The apparatus 1100 may for example be implement one of the above-mentioned wireless devices 10, the interferer device 20, access point 100, or controller 200, or at least a part thereof. As illustrated, the apparatus 1100 may be provided with a module 1110 configured to control transmission of an interference signal, such as explained in connection with step 1010. Further, the apparatus 1100 may be provided with a module 1120 configured to coordinate transmission of the data with transmission of the interference signal, such as explained in connection with step 1020. Further, the apparatus 1100 may be provided with a module 1130 configured to monitor the effect of the interference signal on the radio transmissions, such as explained in connection with step 1030. Further, the apparatus 1100 may be provided with a module 1040 configured to optimize the radio transmissions, such as explained in connection with step 1140.

It is noted that the apparatus 1100 may include further modules for implementing other functionalities, such as known functionalities of a radio device or apparatus for controlling a radio device. Further, it is noted that the modules of the apparatus 1100 do not necessarily represent a hardware structure of the apparatus 1100, but may also correspond to functional elements, e.g., implemented by hardware, software, or a combination thereof.

Figure 12:
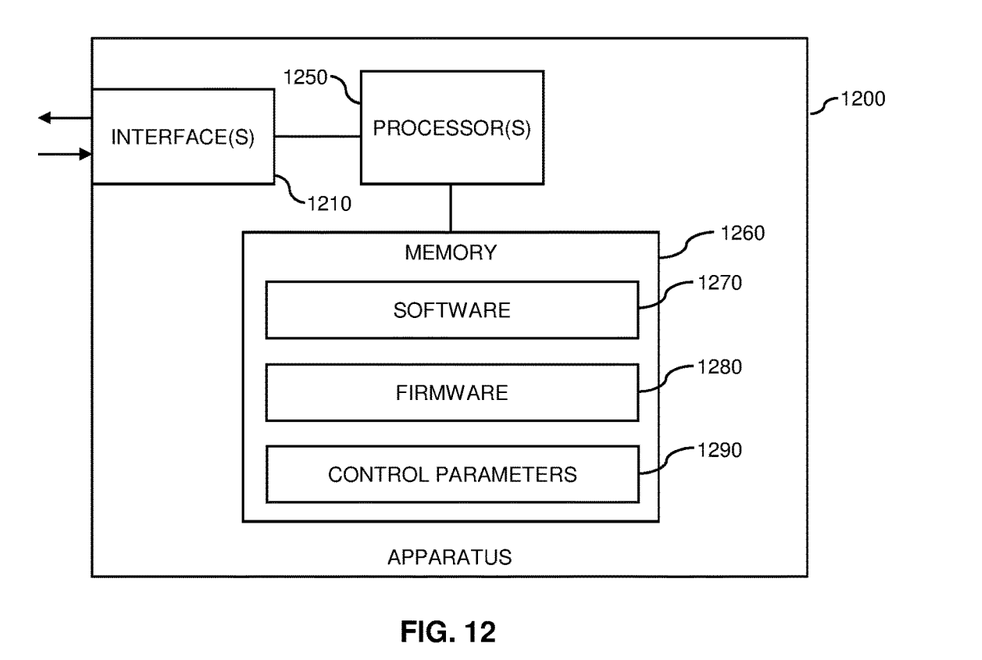
FIG. 12 schematically illustrates structures of an apparatus according to an embodiment of the invention.

FIG. 12 illustrates a processor-based implementation of an apparatus 1200 which may be used for implementing the above described concepts. For example, the structures as illustrated in FIG. 12 may be used for implementing the concepts in a radio device, such as one of the above-mentioned wireless devices 10, the interferer device 20, access point 100, or controller 200, or a part thereof.

As illustrated, the apparatus 1200 includes one or more interfaces 1210. In some scenarios, e.g., if the apparatus corresponds to one of the above-mentioned wireless devices 10, the interferer device 20 or access point 100, the interface(s) 1210 may include at least one radio interface. Alternatively or in addition, the interface(s) 1210 may include at least one wire based interface, such as the above-mentioned interface illustrated between the controller 200 and the access point 100.

Further, the apparatus 1200 may include one or more processors 1250 coupled to the interface(s) 1210 and a memory 1260 coupled to the processor(s) 1250. By way of example, the interface(s) 1210, the processor(s) 1250, and the memory 1260 could be coupled by one or more internal bus systems of the apparatus 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of a radio device or apparatus for controlling radio devices, such as explained in connection with FIG. 10.

It is to be understood that the structures as illustrated in FIG. 12 are merely schematic and that the apparatus 1200 may actually include further components which, for the sake of clarity, have not been illustrated, e.g., further interfaces or processors. Also, it is to be understood that the memory 1260 may include further program code for implementing known functionalities of an a radio device or apparatus for controlling radio devices, e.g., conventional functionalities for scheduling transmissions of data and/or for controlling retransmissions. According to some embodiments, also a computer program may be provided for implementing functionalities of the apparatus 1200, e.g., in the form of a physical medium storing the program code and/or other data to be stored in the memory 1260 or by making the program code available for download or by streaming.

As can be seen, the concepts as described above may be used for efficiently assessing the effects of interference during ongoing operation of a wireless communication system. Using the controlled transmission of the interference signal, interference may be introduced in a pro-active and controlled manner, which allows for avoiding or at least reducing adverse effects on ongoing transmissions of data. Based on the pro-actively introduced interference, the effects of interference can be assessed in a precise manner, which allows for accurately optimizing the radio transmissions. This helps to efficiently achieve desired targets with respect to reliability and/or latency.

It is to be understood that the examples and embodiments as explained above are merely illustrative and susceptible to various modifications. For example, the illustrated concepts may be applied in connection with various kinds of radio technologies, without limitation to the above-mentioned LTE technology, 5G technology, or WLAN technology. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or a cloud platform.

The invention claimed is:

1. A method of managing radio transmissions, the method comprising:

during transmission of data by radio transmissions from a first radio device to a second radio device, controlling a third radio device to transmit an interference signal on radio resources used by the radio transmissions from the first radio device to the second radio device, the controlling of the third radio device comprising controlling a position of the third radio device and controlling a transmission direction of the interference signal;

before transmission of the data, coordinating transmission of the data with transmission of the interference signal by, when scheduling a radio transmission on the radio resources on which the third radio device is to transmit the interference signal, further scheduling a retransmission of data to be conveyed by the radio transmission; and monitoring an effect of the interference signal on the radio transmissions.

2. The method according to claim 1,
wherein said monitoring of the effect of the interference signal on the radio transmissions comprises monitoring of reception quality of at least one of the radio transmissions on the radio resources on which the third radio device transmits the interference signal.

3. The method according to claim 1, comprising:
scheduling the retransmission on other radio resources, on which the third radio device does not transmit the interference signal.

4. The method according to claim 1,
wherein said monitoring of the effect of the interference signal on the radio transmissions further comprises monitoring of reception quality of said retransmission.

5. The method according to claim 1,
wherein said coordinating transmission of the data with transmission of the interference signal comprises:
configuring at least one of the radio transmissions, which is performed on the radio resources on which the third radio device transmits the interference signal, as a dummy transmission not used for conveying the data from the first radio device to the second radio device.

6. The method according to claim 5,
wherein said coordinating transmission of the data with transmission of the interference signal comprises:
providing the second radio device with information on characteristics of the dummy transmission.

7. The method according to claim 5,
wherein said monitoring of the effect of the interference signal on the radio transmissions comprises monitoring of reception quality of the dummy transmission.

8. The method according to claim 1,
wherein said coordinating transmission of the data with transmission of the interference signal is based on management information provided to at least one of the first radio device, the second radio device, and the third radio device.

9. The method according to claim 1,
wherein said monitoring of the effect of the interference signal on the radio transmissions is based on at least one report provided by the second radio device.

10. The method according to claim 1, comprising:
optimizing the radio transmissions from the first radio device to the second radio device based on said monitoring of the effect of the interference signal on the radio transmissions.

11. The method according to claim 1,
wherein said controlling of the third radio device comprises configuring a transmission power of the interference signal, a transmission frequency of the interference signal, a transmission timing of the interference signal, and/or a transmission bandwidth of the interference signal.

12. An apparatus for managing radio transmissions, the apparatus comprising:
at least one processor; and
memory containing instructions executable by the at least one processor, to configure the apparatus to:
during transmission of data by radio transmissions from a first radio device to a second radio device, control a third radio device to transmit an interference signal on radio resources used by the radio transmissions from the first radio device to the second radio device, the controlling of the third radio device comprising controlling a position of the third radio device and controlling a transmission direction of the interference signal, before transmission of the data, coordinate transmission of the data with transmission of the interference signal by, when scheduling a radio transmission on the radio resources on which the third radio device is to transmit the interference signal, further scheduling a retransmission of data to be conveyed by the radio transmission, and
monitor an effect of the interference signal on the radio transmissions.

13. The apparatus according to claim 12,
wherein monitoring the effect of the interference signal on the radio transmissions comprises monitoring of reception quality of at least one of the radio transmission on the radio resources on which the third radio device transmits the interference signal.

14. The apparatus according to claim 12, wherein the memory further contains instructions executable by the at least one processor whereby the apparatus is operative to,
schedule the retransmission on other radio resources, on which the third radio device does not transmit the interference signal.

15. The apparatus according to claim 12,
wherein monitoring the effect of the interference signal on the radio transmissions comprises monitoring reception quality of said retransmission.

16. The apparatus according to claim 12,
wherein coordinating transmission of the data with transmission of the interference comprises, configuring at least one of the radio transmissions, which is performed on the radio resources on which the third radio device transmits the interference signal, as a dummy transmission not used for conveying the data from the first radio device to the second radio device.

17. The apparatus according to claim 16,
wherein coordinating transmission of the data with transmission of the interference signal comprises providing the second radio device with information on characteristics of the dummy transmission.

18. The apparatus according to claim 12,
wherein coordinating transmission of the data with transmission of the interference signal is based on management information provided to at least one of the first radio device, the second radio device, and the third radio device.

19. The apparatus according to claim 12,
wherein monitoring the effect of the interference signal on the radio transmissions is based on at least one report provided by the second radio device.

20. The apparatus according to claim 12, wherein the memory further contains instructions executable by the at least one processor whereby the apparatus is operative to,
optimize the radio transmissions from the first radio device to the second radio device based on said monitoring of the effect of the interference signal on the radio transmissions.

21. The apparatus according to claim 12,
wherein controlling the third radio device comprises configuring a transmission power of the interference signal, a transmission frequency of the interference signal, a transmission timing of the interference signal, and/or a transmission bandwidth of the interference signal.

22. The apparatus according to claim 12,
wherein the apparatus is implemented by the first radio device,
wherein the apparatus is implemented by the second radio device,
wherein the apparatus is implemented by the third radio device, or
wherein the apparatus is implemented by a control device which is separate from the first radio device, the second radio device, and the third radio device.

23. A system, comprising:
a first radio device
a second radio device;
a third radio device;
the first radio device and the second radio device being configured to transmit data by radio transmissions from the first radio device to the second radio device;
the third radio device being configured to transmit an interference signal on radio resources used by the radio transmissions from the first radio device to the second radio device, control a position of the third radio device and control a transmission direction of the interference signal;
at least one of the first radio device, the second radio device, and the third radio device being configured to, before transmission of the data, coordinate transmission of the data with transmission of the interference signal by, when scheduling a radio transmission on the radio resources on which the third radio device is to transmit the interference signal, further scheduling a retransmission of data to be conveyed by the radio transmission; and at least one of the first radio device, the second radio device, and the third radio device being configured to monitor an effect of the interference signal on the radio transmissions.

24. A computer program product comprising a non-transitory computer readable medium storing a program code to be executed by at least one processor of an apparatus for management of radio transmissions, whereby execution of the program code causes the apparatus to:
during transmission of data by radio transmissions from a first radio device to a second radio device, control a third radio device to transmit an interference signal on radio resources used by the radio transmissions from the first radio device to the second radio device, the controlling of the third radio device comprising controlling a position of the third radio device and controlling a transmission direction of the interference signal;
before transmission of the data, coordinate transmission of the data with transmission of the interference signal by, when scheduling a radio transmission on the radio resources on which the third radio device is to transmit the interference signal, further scheduling a retransmission of data to be conveyed by the radio transmission; and
monitor an effect of the interference signal on the radio transmissions.

* * * * *